Sept. 16, 1930.  L. G. LYMAN  1,775,648
PISTON RING
Filed Aug. 20, 1927
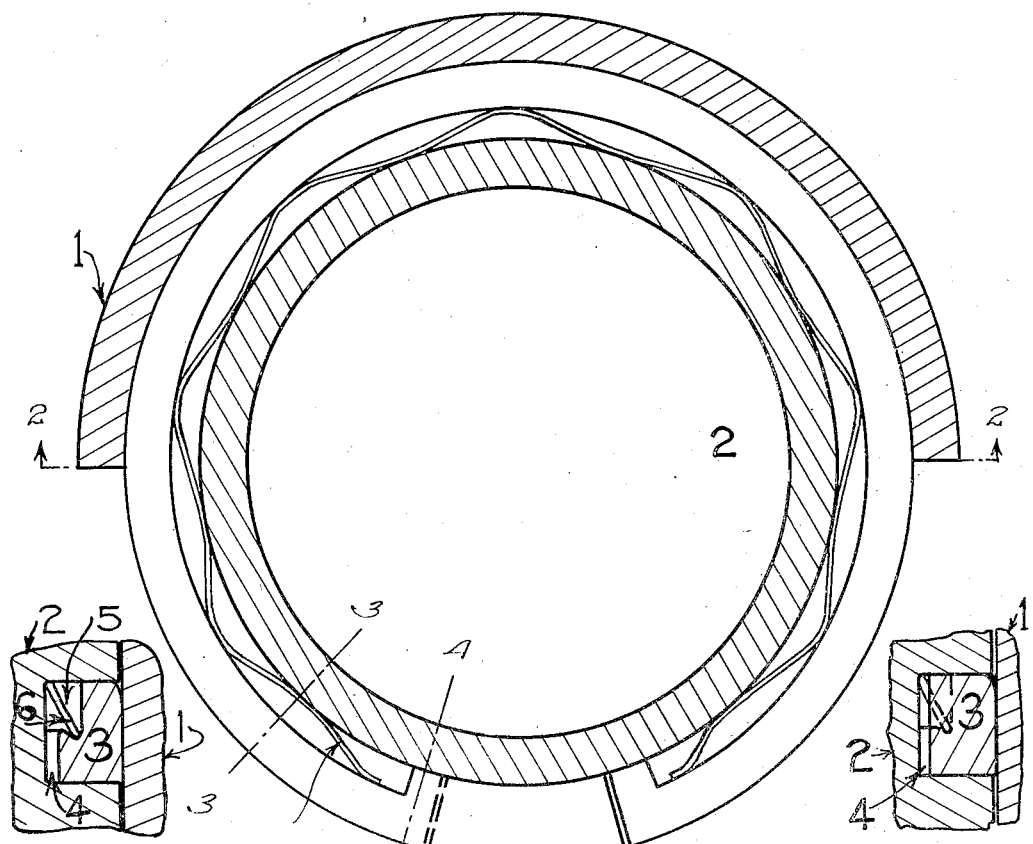
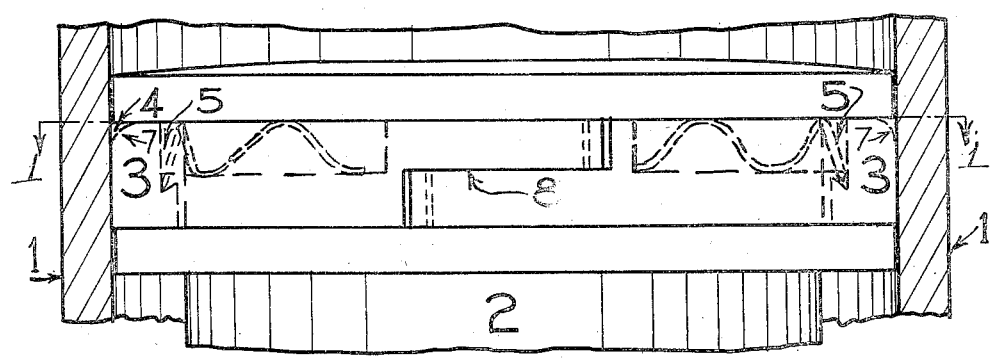
INVENTOR
Lew G Lyman Patented Sept. 16, 1930

1,775,648

UNITED STATES PATENT OFFICE

LEW G. LYMAN, OF PHILADELPHIA, PENNSYLVANIA

PISTON RING

Application filed August 20, 1927. Serial No. 214,359.

My invention relates to improvements in packing or piston rings for pistons and cylinders whereby a more perfect packing is secured between the pressure chamber and piston, as for example, in the well known internal combustion engine to which my ring is particularly adapted, and at the same time maintaining suitable lubrication and minimum of wear. It is more particularly adapted to that class of rings wherein a spring is employed to compress the ring on its seat and also act by torsion to expand the ring.

It is within the province of the disclosure to improve generally and to enhance the utility and safety of the operation of that class of device to which the invention relates.

In piston rings of this class it is customary practice to cut an annular groove on the inner periphery of the ring to accommodate a spring wire coacting with the walls of the piston groove forces the ring downward on its seat and at the same time outward against the walls of the cylinder.

In the installation of the spring and ring to the piston there is grave danger of the spring ends coming out of the slot channel and wedging itself between the piston and the wall of the cylinder. The wire is usually constructed of hard spring steel which obviously will cut and score the cylinder walls if operated in that position. The first object of my invention is to provide a novel construction of the groove in the piston ring wherein the spring may be positively and securely positioned so that the danger of it coming out of place during installation is eliminated. In rings of the type aforesaid the constant reciprocating movement of the ring will cause the same to rock or turn within the confining channel area, thereby destroying its function. The second object of my invention is to provide a novel structure that will keep the ring securely on its seat. A further and third object of my invention is to provide a ring that will not chatter or become noisy in its operation, or to allow the vacuum on the downward stroke of the piston to draw oil past the rings into the combustion chamber.

A fourth object of my invention is to provide a piston ring that will not collect oil on the upward stroke of the piston and will clean the cylinder walls on the downward stroke; and to provide other improvements as will hereinafter appear.

With these objects in view my present invention consists of a novel construction and arrangement of parts as will hereinafter be more fully described and pointed out in the claim, reference being had to the accompanying drawing forming part of the specification and in which; Fig. 1 is a sectional plan of Fig. 2 on a line 1—1, showing a cylinder with its piston and rings; Fig. 2 is a section on line 2—2 of Figure 1 showing a piston of any well known internal combustion engine where the piston is provided with a piston ring and adapted to operate within the cylinder which is drawn in section; Fig. 3 is a section on line 3—3 of Figure 1 and shows more clearly the position of the spring and its retaining groove in relation to the ring and the cylinder wall; Fig. 4 is a section on line 4—4 of Figure 1, showing a section of the ring through its solid structure; and Fig. 5 shows a part of the sinuous spring and more particularly the flat portion at the loops or apexes. In said figures similar numerals of reference refer to similar parts throughout the several views. The numeral 1 designates the walls of the cylinder through which the piston 2 is adapted to reciprocate. In order that the piston may reciprocate freely within the said cylinder a pedetermined clearance between the walls of the cylinder and the piston must be maintained and in order to prevent the escape of the explosive pressure created on top of the piston or the passage of oil from the bottom of the crank case to the top of the piston, the piston ring 3 is provided. The said ring 3 is adapted to engage in a suitable annular channel 4 provided in the piston 2. The said ring 3 is provided with a break 8 in its annular continuity to allow it to expand over the top of the piston and into the annular channel 4. This is known as a step cut or break and is the preferred form although other types of breaks are in common practice.

The numeral 5 designates an annular acute angle groove disposed in the inner surface of the ring 3, one leg of the angle extends substantially vertically downward from the top of the ring to a point below the center of gravity of the said ring. The other leg of the angle extends upwardly to the inner periphery of the ring forming an acute angle. The said angular groove does not extend the entire circumference of the ring 3 but starts and terminates a predetermined distance from the break, the portion intervening presenting substantially a solid cross section. The numeral 6 designates a spring of resilient wire formed into a sinuous curve, the loops or apexes being of a flat surface. The said spring 6 is positioned within the ring slot 5 and inclined to the axis of the ring so that part of the spring is enclosed in the groove and part extends therebeyond and inside the area of said ring channel so that a pressure is exerted by the spring on the piston ring to force it against the lower bearing surface of the ring channel, and outwardly to expand the ring against the cylinder wall. The upper outer periphery of the ring 3 is chamfered at 7 so that upon the upward stroke of the piston it will allow the oil on the cylinder wall to pass by the piston, but on the downward stroke a cutting edge is presented which scrapes the surplus oil from the wall of the cylinder and drains the same back into the crank case. Having thus described the various parts throughout the several views its mode of operation will be substantially as follows all of which will be readily understood by those skilled in the art to which this invention relates.

In applying the piston ring to the piston the sinuous spring is placed in the ring groove slot and the ring is expanded and placed in the annular channel at the same time the spring is compressed so that it enters the channel behind the ring. During this operation the ends of the spring abut against the ends of the angular groove in the ring thereby preventing the wire from creeping out and over the top of the ring which if not corrected would score and eventually destroy the inner wall of the cylinder. In the normal operation of the piston should the piston ring be not firmly seated the vacuum on the downward stroke would raise the ring off its seat which allows oil to be drawn underneath and into the annular channel back of the ring, whereupon the upward stroke oil is forced over the top of said ring from behind the ring upward into the combustion chamber. The sinuous spring, however, being inclined to the axis of the ring forms a positive pressure which keeps the ring on its seat and firmly against the walls of the cylinder thus preventing the above condition. I prefer to provide a flat surface at the top of the loops of the spring 6 so that the constant motion will not wear a depression in the contact places which would be the case should the loops terminate in a sharp point. The constant motion would also wear the spring at its apexes and cause unseasonable breakage.

During the reciprocating motion of the piston the chamfered edge allows the piston to ride over the oiled surface but on the downward stroke the cutting edge of the ring scrapes the surplus oil away. The frictional contact between the wall of the cylinder and the outer surface of the piston ring will cause the ring to rock or have a tendency to revolve within the annular channel. This is apparent in this type of ring due to the fact that the upper ring surface is smaller in area than the lower or seating surface. To overcome this defect I position the apex of the angular slot well below the center of gravity of the ring and in this manner the tendency of rocking is eliminated, thus accomplishing the second object of my said invention.

I do not wish to limit myself to the exact construction as shown as it is obvious that certain departures can be made therefrom without departing from the spirit and intent of my said invention, but what I claim as new and desire to secure by Letters Patent is:—

The combination of a piston having an annular channel, a circumferentially discontinuous piston ring therein, a groove in the inner periphery of said ring having a wall parallel to cylinder-engaging surface of the ring, and a wire-like, sinuous spring, apexes of which engage said parallel wall of said groove adjacent the lower edge thereof and alternate apexes of which engage said channel adjacent the top thereof.

In testimony whereof I affix my signature.

LEW G. LYMAN.